April 26, 1927.
N. E. CRAUN
1,626,270
POWER TRANSMISSION DEVICE
Filed Aug. 16, 1924
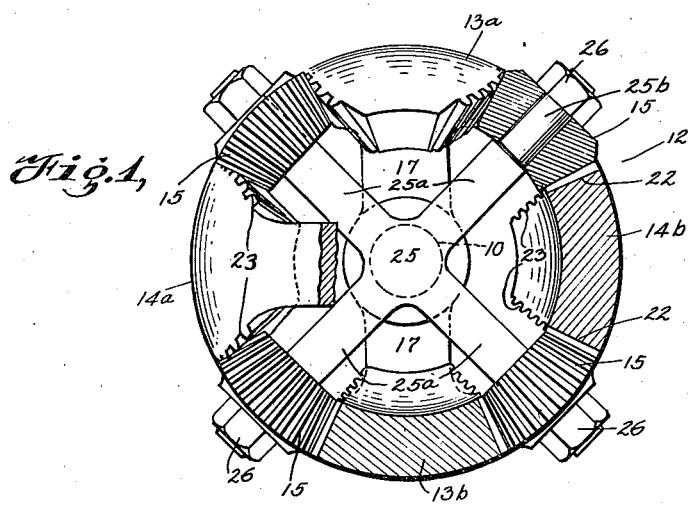
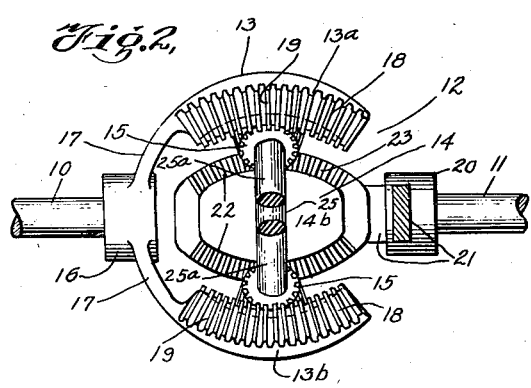
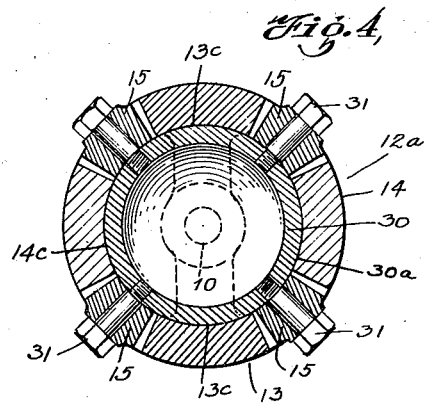
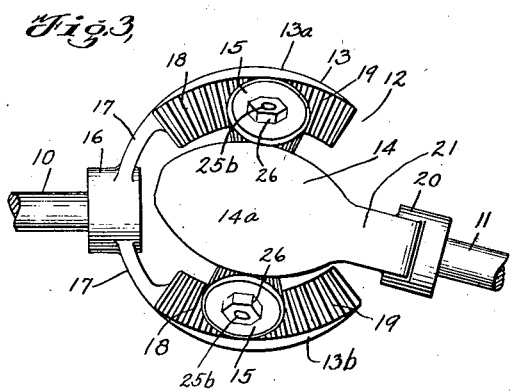
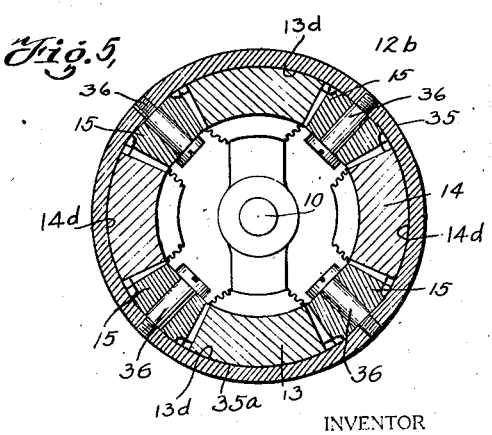
INVENTOR
*NOEL E. CRAUN*
BY
ATTORNEY Patented Apr. 26, 1927.

1,626,270

UNITED STATES PATENT OFFICE.

NOEL E. CRAUN, OF BOGOTA, NEW JERSEY.

POWER-TRANSMISSION DEVICE.

Application filed August 16, 1924. Serial No. 732,383.

This invention relates to power transmission apparatus. More particularly, it is directed to a universal coupling for transmission of power to motor vehicles and other forms of machinery.

An object of the invention is to provide an improved device of the character described having a novel combination of parts whereby a drive and a driven power shaft are permitted to freely change their angular relation to each other while power is being transmitted from one to the other.

Another object of the invention is to provide a practical device of the character described comprising few and simple parts which are easy to assemble, and which shall be compact in construction and efficient in operation to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is an end elevational view of a universal coupling embodying the invention with parts broken away to more clearly show the construction;

Fig. 2 is a front elevational view partly in section corresponding to Fig. 1;

Fig. 3 is a view similar to Fig. 2 showing the relative position of the parts with the drive and driven shafts skewed relative to each other;

Fig. 4 is a cross-sectional view corresponding to Fig. 1 showing a modified construction; and Fig. 5 is a cross-sectional view corresponding to Fig. 1 showing another modified construction.

Referring in detail to the drawing, 10 and 11 indicate a drive and a driven shaft respectively, the former being adapted to receive power from any suitable primary or intermediate source and to transmit such power to the latter through a universal coupling joint 12 embodying the invention.

As seen from Figs. 1 and 2, the universal coupling joint 12 comprises two similar gear members 13 and 14 disposed in co-operative relation to each other and interconnected by a set of bevelled pinions 15 to permit bringing said shafts 10 and 11 at an angle to each other in any direction. Keyed or otherwise fixedly secured to the free end of drive shaft 10 is a central hub 16 of the gear member 13, said hub projecting from the junction of a pair of arcuate forked arms 17 which support at their extreme ends and in diametrically opposed position elongated spherical segmental portions 13$^a$ and 13$^b$. Each of said portions 13$^a$, 13$^b$ is provided with a bevelled peripheral surface 18, of which the two longer sides are adapted to carry radially extending teeth 19 for meshing with the bevelled pinions 15 as shown in Fig. 2.

The gear member 14 being constructed substantially like member 13 just described has a central hub 20 secured to the driven shaft 11, and forked arms 21 supporting like segmental portions 14$^a$ and 14$^b$ having bevelled peripheral surfaces 22 which are likewise adapted to carry teeth 23 for meshing with the pinions 15.

Suitable bearings and aligning supports for pinions 15 may be provided, as for example, a spider member 25 having radial arms 25$^a$ extending at right angles to each other and terminating in an axle 25$^b$ for securely supporting one of the pinions 15 for rotation thereon. Nuts 26 threaded on the ends of the axles 25$^b$ or other suitable means may be provided to hold the pinions 15 in position.

To assemble the universal coupling joint 12, the drive and driven shafts 10 and 11 are brought into alignment with the segmental portions 13$^a$ and 13$^b$ of the gear member 13 positioned substantially at right angles to the similar segmental portions 14$^a$, 14$^b$ of the gear member 14, and the spider member 25 is then inserted so that the arms 25$^a$ alternately extend between each of said segmental portions. The latter and the spider member 25 are then brought into relative aligning position, such as shown in Figs. 1 and 2, and the pinions 15 are secured in place on the axles 25ᵇ to mesh with the teeth 18 and 23 on the gear member 13 and 14.

In the operation of the universal coupling joint 12, the skewing of the shaft 10 and 11 relative to each other causes the pinions 15 to roll out of the normally central position shown in Figs. 1 and 2 as for example to the position shown in Fig. 3, and to reciprocatingly rotate back and forth between the teeth 18 and 23 of the gear members 13 and 14 respectively. Thus it is apparent from the above description and drawings that the pinions 25 form a floating coupling between the gear members 13 and 14 that interlockingly connect the drive and driven shafts 10 and 11.

In Fig. 4 at 12ᵃ, a modified construction is shown in which the spider member 25 is replaced by a spherical shell 30 and bearing bolts 31 screwed into the shell 30 for rotatively supporting the pinions 15. The outer surface 30ᵃ of the shell 30 may be made to slidingly fit on the inner surfaces 13ᶜ and 14ᶜ of the gear members 13 and 14 to serve as an interior coupling brace between the driving and driven members of the universal coupling.

In Fig. 5 at 12ᵇ another modified construction is shown in which an exterior band or cage 35 serves to support the pinion 15 for rotation on stud bolts 36. The inner surface 35ᵃ of the cage 35 may be made to slidingly fit on the outer surfaces 13ᵈ and 14ᵈ of the gear members 13 and 14 to act as an external coupling brace for the driving and driven members of the universal coupling. If desired, the band 35 may be added to either of the structures shown in Figs. 1 and 4.

The shell 30 and band 35, shown in Figs. 4 and 5 respectively may be constructed for assembly with the other parts of their respective universal joints in any suitable, well known manner. For example, shell 30 may be provided with flattened polar portions (not shown) to permit the passage of the gear members 13 and 14 over said flattened portions, after which the flattened shell portion may be turned so that they face the ends of the drive and driven shafts 10 and 11. It is apparent from Fig. 4 that after the pinion 15 is mounted in position, the shell 30' will have but limited movement and will serve for the purpose described. The band 35 may be of split construction (not shown) and the parts thereof held in position in any suitable manner well understood in the art.

The devices above described are capable of having the drive and driven shafts thereof skewed to any angle relative to each other in any direction. In motor vehicles and other machinery the change of angle is often limited to a single plane. To effect such limitation a two part swivel clevis may be provided (not shown) having their pivoted members embracing the universal joint and supported independently of the drive and driven shafts as is well understood.

It will thus be seen that there is provided a device in which the several objects of this invention are achieved and which is well adapted to meet the conditions of practical use.

As various possible embodiments might be made of the above invention and as various changes might be made of the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. In a power transmitting device, a universal coupling joint comprising a drive shaft, a driven shaft, gear members, each having a non-continuous series of teeth secured to said shafts, a plurality of gears meshing with said teeth and means to hold said gears and members in mesh for coupling said shafts and for interlocking said members against separation.

2. A power transmitting device comprising a drive shaft, a driven shaft, gear members secured to said shafts, a plurality of gears meshing with said members and means to hold said gears and members in mesh for coupling said shafts and for interlocking said members against separation, said members and gears arranged to permit skewing of the driven shaft to any angle in any direction relative to the drive shaft with the latter in a fixed position.

3. A power transmitting device comprising a drive shaft, a driven shaft normally aligned with said driven shaft, gear members, each having a non-continuous series of teeth secured to said shafts, and means pivotally connecting said members, said means including a plurality of pinions engaging said teeth, the axes of said pinions normally extending at right angles to said shafts when in aligned position.

4. A power transmission device comprising a drive shaft, a driven shaft, pairs of arcuate gear members, each having a non-continuous series of teeth secured to each of said shafts, and means engaging said teeth to couple said shafts and to interlock said members against separation.

5. A power transmitting device comprising a drive shaft, a driven shaft, normally aligned with said drive shaft, pairs of arcuate gear members having teeth formed on convexed surfaces thereof secured to each of said shafts, and means engaging said members to interlockingly couple said shafts, said means including a plurality of pinions having the axis thereof extending at right angles to said normally aligned shafts.

6. A power transmitting device comprising a drive shaft, a driven shaft, pairs of gear members, each having a non-continuous series of teeth secured to each of said shafts, pairs of pinions and means for supporting said pinions to mesh with said teeth, said members, pinions and means forming an interlocking coupling for said shafts.

7. In a power transmitting device, a universal coupling joint comprising a drive shaft, a driven shaft, gear members secured to each of said shafts, a plurality of gears meshing with said members for coupling said shafts, said gears serving to interlock said members against separation, and means extending over said members for bracing the coupling connection between said member.

8. A power transmitting device comprising a drive shaft, a driven shaft, pairs of gear members, each having a non-continuous series of teeth secured to each of said shafts, pairs of pinions, and means for supporting said pinions to mesh with said members, said members, gears and means forming an interlocking coupling for said shafts, said means co-acting with said members to brace the coupling connection between said shafts.

In testimony whereof I affix my signature.

NOEL E. CRAUN.